Patented Sept. 26, 1944

2,358,836

UNITED STATES PATENT OFFICE 2,358,836

WATER-SOLUBLE POLYVINYL ACETALS

Donald R. Swan, Rochester, N. Y., assignor to Eastman Kodak Company, Rochester, N. Y., a corporation of New Jersey No Drawing. Application May 26, 1942, Serial No. 444,545

7 Claims. (Cl. 95—7)

This invention relates to water-soluble polyvinyl acetals and to a process for preparing them. This application is a continuation-in-part of my copending application Serial No. 349,229, filed August 1, 1940.

Water-soluble polyvinyl acetals are known. Thus, polyvinyl acetals which are soluble in cold water but insoluble in hot water, can be prepared by condensing a polyvinyl alcohol with an insufficient amount of a saturated aliphatic aldehyde to combine with all the hydroxyl groups, so that a considerable proportion of the hydroxyl groups are uncombined. Still another type of cold water-soluble polyvinyl acetal which is soluble over a greater range of temperatures than the aforesaid type and which has a lower softening point that the aforesaid type, can be prepared by condensing polyvinyl alcohol with an aliphatic alkoxyaldehyde (see my copending aplication Serial No. 356,501, filed September 12, 1940).

I have now found a new kind of water-soluble polyvinyl acetal which is soluble in both cold and hot water and which is more resistant to salting-out from solution than the polyvinyl alkoxy acetals mentioned above. My new water-soluble polyvinyl acetals act as dispersing agents especially for the silver halide in photographic emulsions, I have found.

It is, accordingly, an object of my invention to provide new water-soluble polyvinyl acetals. A further object is to provide a process for preparing such acetals. A still further object is to provide photographic emulsions in which the silver halide is dispersed by means of such acetals. Other objects will become apparent hereinafter.

In accordance with my invention, I prepare water-soluble polyvinyl acetal resins by condensing an aldehyde containing a quaternary ammonium salt group, with a polyvinyl compound containing polyvinyl alcohol hydroxyl groups, e. g. a polyvinyl alcohol or a partially deesterified polyvinyl ester, etc. As aldehydes containing a quaternary ammonium salt group, the following are exemplary: 4-formylphenyltrimethylammonium methylsulfate which can be represented by the following formula:

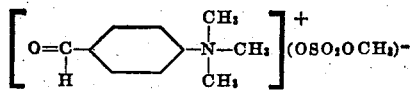

and which has also been called p-trimethylaminobenzaldehyde methylsulfate, 4-formylphenyltriethylammonium iodide, β-formylethyltrimethylammonium methylsulfate and 2-formyl-1-naphthyltrimethylammonium methylsulfate. The p-trialkylaminobenzaldehyde salts in which the alkyl groups contain from one to two carbon atoms are advantageously employed. The condensations can be carried out in an aqueous or alcoholic medium using the known acetal condensation catalysts, e. g. hydrochloric acid, sulfuric acid, zinc chloride and the like. The following examples will serve to illustrate my new polyvinyl acetals and the manner of obtaining the same.

EXAMPLE 1.—*Polyvinyl acetal of 4-formylphenyltrimethylammonium methylsulfate*

13 g. of 4-formylphenyltrimethylammonium methylsulfate dissolved in sufficient water to give 39 cc. of solution, were mixed with 44 cc. of a 10 percent (by weight) aqueous solution of polyvinyl alcohol. To the resulting mixture were added 0.2 cc. of N sulfuric acid. The clear solution formed by these materials was allowed to react for several hours. The polyvinyl acetal was isolated by diluting the reaction mixture with three times its volume of water and pouring the diluted reaction mixture into acetone. The polyvinyl acetal precipitated in the acetone as white fibers. These were dried in vacuo and obtained as fluffy, white fibers which dissolved easily in water at 25° C. Contrasted with this, polyvinyl alcohol dissolves in water readily, only at much higher temperatures.

EXAMPLE 2.—*Polyvinyl acetal of acetaldehyde and 4-formylphenyltrimethylammonium methylsulfate*

41 g. of polyvinyl acetate, 128 g. of 95 percent ethyl alcohol, 12.5 g. of 4-formylphenyltrimethylammonium methylsulfate and 3 g. of concentrated sulfuric acid dissolved in 30 cc. of ethyl alcohol were mixed together. The mixture was allowed to stand for two days at 55° C. Acetaldehyde (9 g.) was then stirred in, and after three weeks at about 25° C., the solution was poured into acetone to precipitate the polyvinyl acetal. The acetal was washed several times with acetone and then dried in the air. The dried acetal contained a hydroxyl group content equivalent to about 17 percent by weight of polyvinyl alcohol and an acetate group content equivalent to about 6 percent by weight of polyvinyl acetate.

EXAMPLE 3.—*Polyvinyl acetal of 4-formylphenyldimethylmethoxymethylammonium chloride*

To 200 g. of 10 percent polyvinyl alcohol solution (medium viscosity) was added a solution of 4-formylphenyldimethylmethoxymethylammonium chloride (prepared by adding 10 g. of dimethylaminobenzaldehyde to 20 cc. of 1,4-dioxane containing 7 g. of monochlorodimethyl ether). 10 g. of hydrochloric acid (sp. g. 1.18) were added to the mixture, as a catalyst. The resulting mixture was allowed to stand at 20° to 25° C. for 18 hours. It was then diluted with an equal volume of water, and the diluted mixture poured into acetone to precipitate the polyvinyl acetal which was thus obtained in a fluffy, white fibrous form. After drying in vacuo at 40° C. for 18 hours, the polyvinyl acetal dissolved readily in water. An aqueous solution of the polyvinyl acetal dispersed silver halide readily and formed an unusually stable foam.

Similarly the polyvinyl acetal of 4-formylphenyltrimethylammonium - p - toluenesulfonate can be prepared, employing 4-formylphenyltrimethylammonium-p-toluenesulfonate. The aldehydes containing the quaternary ammonium salt group can be prepared by treating the appropriate dialkylaminoaldehyde with an alkyl salt, at ordinary temperatures, e. g. 20° to 25° C.

My new water-soluble polyvinyl acetals can be employed as dispersing agents for silver halide in the preparation of photographic silver halide emulsions. Preferably the water-soluble acetals are employed in conjunction with gelatin, polyvinyl alcohol or water-soluble cellulose derivatives.

What I claim as my invention and desire to be secured by Letters Patent of the United States is:

1. A water-soluble polyvinyl acetal in which at least a part of the acetal groups are 4-formylphenyltrimethylammonium salt acetal groups.

2. A water-soluble polyvinyl acetal in which at least a part of the acetal groups are 4-formylphenyltrimethylammonium methylsulfate acetal groups.

3. A water-soluble polyvinyl acetal in which at least a part of the acetal groups are 4-formylphenyltrimethylammonium p - toluenesulfonate acetal groups.

4. A water-soluble polyvinyl acetal in which at least a part of the acetal groups are 4-formylphenyldimethylmethoxymethylammonium chloride acetal groups.

5. A process for preparing a water-soluble polyvinyl acetal comprising treating a polyvinyl compound containing polyvinyl alcohol hydroxyl groups, with a 4-formylphenyltrialkylammonium salt in which the alkyl groups contain from one to two carbon atoms, in the presence of an acetal condensation catalyst.

6. A water-soluble polyvinyl acetal in which at least a part of the acetal groups are 4-formylphenyltrialkylammonium salt acetal groups in which the alkyl groups contain from one to two carbon atoms.

7. A water-soluble polyvinyl acetal in which at least a part of the acetal groups are 4-formylphenyltrialkylammonium salt acetal groups in which the alkyl groups contain from one to two carbon atoms, incorporated in a photographic silver halide emulsion as a dispersing agent for the silver halide.

DONALD R. SWAN.